R. Simpson,
Cage Trap,
No 70,370. Patented Oct. 29, 1867.

Witnesses:
Jas. H. Layman
Fred Baehrens

Inventor:
R. Simpson
By Knight Bros
Attys

United States Patent Office.

ROBERT SIMPSON, OF PORT JEFFERSON, OHIO, ASSIGNOR TO HIMSELF AND DAVID WILKINSON, OF THE SAME PLACE.

Letters Patent No. 70,370, dated October 29, 1867.

IMPROVEMENT IN ANIMAL TRAPS.

The Schedule referred to in these Letters Patent and making part of the same.

TO ALL WHOM IT MAY CONCERN:

Be known that I, ROBERT SIMPSON, of Port Jefferson, in the county of Shelby, and State of Ohio, have invented a new and useful Improvement in Rat-Traps; and I do hereby declare the following to be a full, clear, and exact description of the same, reference being had to the accompanying drawings, making part of this specification.

In this trap a series of wings is attached to a rotary shaft, which is actuated by a spring or weight, and which, at every operation, gives a partial revolution to the wings, so that they are consecutively caused to assume a horizontal position, thus forming a platform upon which the rat stands while nibbling at the bait, and from which he is thrown down into the box or trap, as hereinafter described.

The invention more particularly consists in the provision of an adjustable notched bar, which engages the sliding triggers to set the trap when in operation, but which may be shifted in such a way as to enable the triggers to revolve with their respective wings without interruption in the act of setting the trap, which is effected by turning the wings by hand in a direction the reverse of that in which they revolve when in operation.

Figure 1:
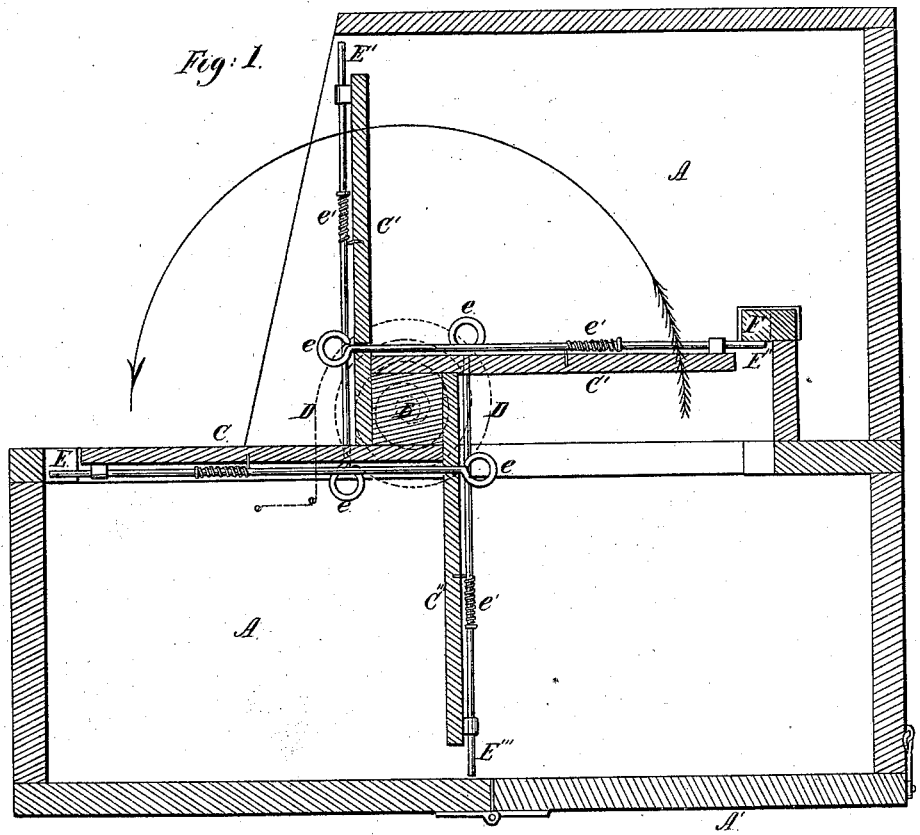
Figure 1 is a vertical section of a rat-trap illustrating my invention, the plane of section being at right angles to the axis upon which the wings are mounted.
Figure 2:
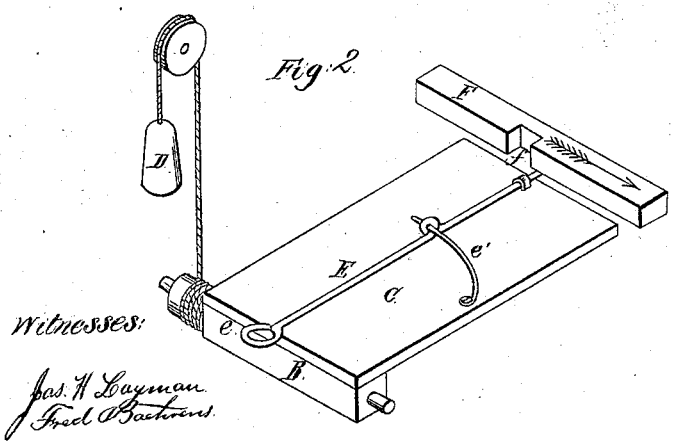
Figure 2 is a detached view illustrating the operation of the adjustable setting-bar, and also embodying a modification.

A is a box, in which the rats are to be entrapped and confined. B is a journalled shaft, constituting an axis upon which the wings C C' C'' C''' are mounted. A volute spring, D, fig. 1, or its equivalent, consisting of a weight and cord, indicated by the same letter in fig. 2, is applied to the shaft B, so that when the triggers E E' E'' E''' are successively disengaged or retracted from the setting-bar F, a quick revolving motion is imparted to the wings, and the rat is suddenly dropped into the box from the outer horizontal wing, upon which it stands while nibbling at the bait, which is suitably attached to the annular or hook-shaped extremities, e, of the triggers E. Only one trigger is engaged at a time in setting the trap, and when this is withdrawn from beneath the bar F, the wings revolve and deposit the rat, as above described. That trigger is then projected beyond the free extremity of its wing, so as to be in position to engage beneath the bar F when the setting function again devolves upon it. This projection of each trigger may be effected by the spiral spring $e'$, fig. 1, or by a spring of the kind shown at $e'$, fig. 2. The bar F is notched at $f$, as shown in fig. 2, said bar being so supported in the sides of box A that it can be adjusted laterally. By shifting the bar F so as to bring the notch $f$ in the plane of revolution of the triggers E, the wings may be turned by hand in a direction the reverse of that in which they revolve when the trap is in operation. This reverse motion of the wings winds up the weight or spring, and thus stores or accumulates power for protracted use. In fig. 2 the bar E is in its effective or operative position, in which case the notch $f$ does not stand in the plane of revolution of the triggers E. Although all the triggers E are baited, the wings and their appendages are enclosed in such a way that when the trap is set access can only be had to the bait of the setting trigger. The rats can be removed from the trap by opening the hinged door A', though any other provision may be made for this purpose.

I claim herein as new, and of my invention—

The combination of the notched bar F with the spring-triggers E, wings, C, shaft B, and spring or weight D, all arranged and operating in the manner and for the purpose set forth.

In testimony of which invention I hereunto set my hand.

ROBERT SIMPSON.

Witnesses:
 E. SMITH,
 N. B. BURRESS.